Dec. 8, 1959 H. A. SHERWOOD 2,916,561

TRANSDUCER

Filed Oct. 7. 1955 2 Sheets-Sheet 1

INVENTOR.
Henry A. Sherwood
BY
Munn, Liddy, Nathanson + March
ATTORNEYS

Dec. 8, 1959 H. A. SHERWOOD 2,916,561

TRANSDUCER

Filed Oct. 7, 1955 2 Sheets-Sheet 2

INVENTOR.
Henry A. Sherwood
BY
Munn, Liddy, Nathanson & March
ATTORNEYS

United States Patent Office 2,916,561

Patented Dec. 8, 1959

2,916,561

TRANSDUCER

Henry A. Sherwood, Woodbridge, Conn., assignor, by mesne assignments, to Henry A. Sherwood, Millburn, N.J.

Application October 7, 1955, Serial No. 539,115

3 Claims. (Cl. 179—100.41)

This invention relates to devices which change or convert energy from one form to another, such devices being commonly known as transducers, and relates more particularly to transducers as used in connection with the recording and/or reproducing of sound.

In dictating machines and other types of recording and reproducing equipment, electrical transducers are utilized by which mechanical vibrations from a stylus or needle are converted into electrical impulses in a circuit, and vice versa.

Especially in the matter of reproduction of recorded material, difficulty has been experienced in the past because undesired vibrations were imparted to the cartridge body or stylus-carrying member of the transducer, causing undesirable impulses in the electrical play-back circuit which resulted in distortion, poor tone, etc. Such undesired vibrations may, for example, occur as follows: It is considered most desirable that the body member or cartridge of the transducer be firmly held and uniformly moved, thus approaching the concept of having a fixed or immobile unit or body member, while the stylus or needle is made readily movable to respond to the undulations of the sound record medium. However, in practice it is found necessary to mount the body member so that it may have limited movement with respect to its tone arm or carrier. Such mounting of the body member or cartridge provides what is known as "lateral compliance," and allows for eccentricity of the grooves of the recording disk; in other words, the cartridge and stylus in practice are allowed to follow independently of the tone arm, relatively slow and large spirals such as may be presented by eccentric grooves. This mounting permits the cartridge body member to pick up lateral vibrations, which are then converted into distortion-producing impulses in the play-back circuit. Also, undesired vibrations may be imparted to the body member or cartridge as a result of the resonance of the tone arm, or vibrations of the base plate, rumble of the turntable (where such is used). acoustical feedback, etc.

In the past these unwanted electrical impulses introduced in the play-back circuit were electronically filtered out. However, this was done at the expense of volume and fidelity of tone, and did not represent the optimum solution of the problem.

The above disadvantage and drawback of prior reproducing equipment and transducers is obviated by the present invention, and an object of the invention is to provide an improved combination tone arm and cartridge assembly wherein there is limited lateral movement or compliance of the cartridge to enable the stylus to properly follow the grooves of the record medium, but wherein there is obviated unwanted vibrations of the cartridge body, and consequently unwanted electrical impulses in the play-back circuit.

Another object of the invention is to provide an improved combination tone arm and cartridge assembly having lateral compliance, which however provides high-fidelity electrical impulses for the amplifier or play-back circuit, such impulses being devoid of unwanted or stray, distortion-producing factors normally requiring circuit filtering.

A still further object of the invention is to provide a novel and improved cartridge or transducer device having mechanical, vibration-damping means by which distortion-producing vibrations or movements of the cartridge body member are greatly minimized or wholly eliminated.

Yet another object of the invention is to provide an improved cartridge and/or tone arm assembly in accordance with the above, wherein lateral compliance of the cartridge body member is provided for and permitted, while vibrations of relatively low frequency but of an order higher than those due to groove eccentricity of the record medium, are mechanically damped and minimized in the cartridge body.

A feature of the invention resides in the provision of improved, transducer-containing devices having all of the above advantages, which are nevertheless simple in construction and economical to manufacture.

Other features and advantages will hereinafter appear.

In the drawings accompanying this specification, similar characters of reference indicate corresponding parts wherever possible in the several views, in which.

Figure 1:
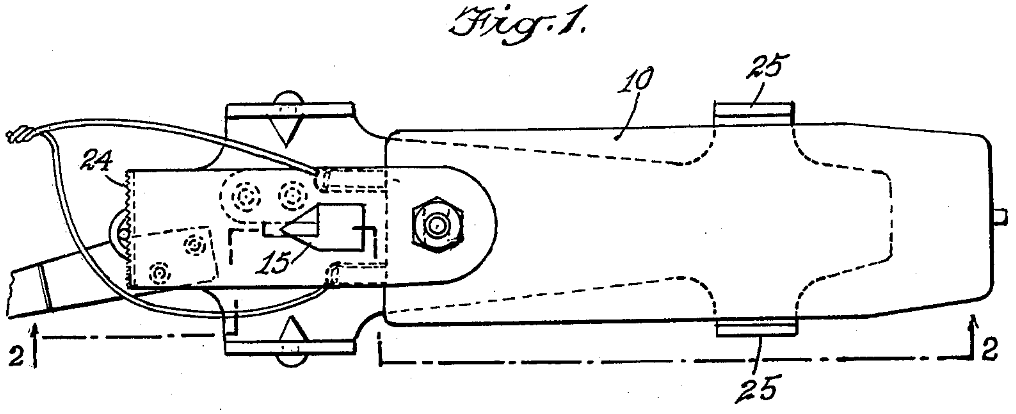
Figure 1 is a bottom view of an improved assemblage of tone arm and cartridge or transducer head made in accordance with the invention.
Figure 2:
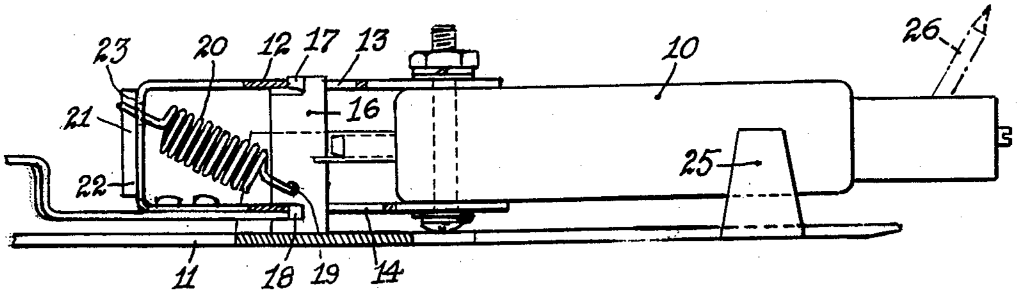
Fig. 2 is a side view of the assemblage of Fig. 1, looking in the direction of the arrows 2—2 in Fig. 1.
Figure 3:
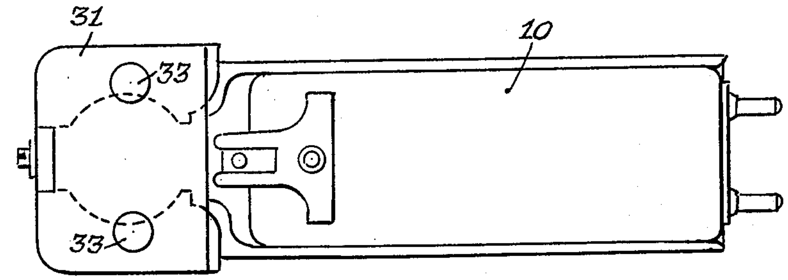
Fig. 3 is a top or plan view of the transducer cartridge per se, which is included in the assemblage shown in Figs. 1 and 2.

Referring to Figs. 1 and 2 there is shown a transducer unit or cartridge 10 mounted in a tone arm chassis or structure 11 so as to have lateral compliance with respect thereto. In accomplishing this, the cartridge 10 is secured to a U-shaped tension bracket 12 having a pair of openings or slots 13 and 14 provided with pointed portions or ends 15. Extending through the slots 13 and 14 of the bracket 12 is a knife-edge pivot member 16 having sharp portions 17 and 18 engaging the pointed ends 15 of the bracket 12. The pivot member 16 has an opening 19 receiving one end of a helical extension spring 20, the other end of which is engaged with an adjustment pin 21 disposed exteriorly of the yoke portion 22 of the bracket 12. As shown, the yoke portion 22 has a slot 23 through which the end of the spring 20 extends, and has teeth 24 providing for selective positioning of the pin 21 to effect the desired centralized position of the cartridge 10 within the tone arm structure 11. A pair of ears 25 is provided on the tone arm structure 11, constituting stops by which lateral movement of the cartridge 10 is limited.

It will be observed from Fig. 1 that the cartridge 10 is maintained centralized between the ears 25 by the spring 20. Also, the said spring maintains the bracket 12 in engagement with the knife edges 17 and 18, holding the cartridge 10 in the relative vertical position shown in Fig. 2 with respect to the tone arm structure 11.

The cartridge 10 has a needle or stylus 26 for engagement with the sound record medium, to set-up vibrations for conversion into electrical impulses. By virtue of the space provided between the ears 25 and the cartridge 10 the latter may have limited relative lateral movement with respect to the tone arm 11, thus providing lateral compliance by which the stylus 26 and cartridge 10 may follow eccentricities of the record grooves without interference from the tone arm structure.

As a consequence of the resilient mounting of the cartridge 10 and the lateral compliance provided thereby, and also due to tone arm resonance, base plate vibrations, turntable rumble, and acoustical feedback, the transducer or cartridge 10, particularly the mass thereof which may be considered the main or body portion and which is hereinafter referred to as the body member, has imparted to it undesirable vibrations and movements which result in unwanted impulse components in the play-back circuit. These unwanted components cause distortion and lack of fidelity in the tone, and according to prior practice have been electrically filtered out of the circuit at the expense of full volume and tone fidelity.

In accordance with the present invention I provide a novel and improved organization of cartridge or body member and mechanical damping means carried thereby, by which unwanted vibrations are counteracted in and eliminated from the cartridge, particularly vibrations in lateral directions, i.e., the directions of the vibratory movements imparted to the stylus 26 by the record medium. As shown in the figures, this improved organization of cartridge and damping means comprises a weighted mass 30 which is loosely carried by the cartridge 10. The mass 30 may have various constructions, and as shown herein is constituted of a plurality of plates 31 and a plurality of washers or perforated members 32 loosely carried on studs 33 which are rigidly secured to the body member of the cartridge. The plates 31 and washers 32 are disposed at that end of the cartridge 10 on which the stylus 26 is located, and are in loose frictional contact with each other, being so arranged as to have limited lateral movement with respect to the cartridge 10 and stylus 26.

I have found that the plates 31 and washers 32 as thus mounted constitute an advantageous and effective damping means by which vibrations imparted to the cartridge body member are counteracted, damped and eliminated, particularly vibrations in directions laterally of the stylus 26. I attribute this effect to the different reactions which the plates and washers have to any given vibrations, since these loosely mounted elements normally do not move in unison or all in one direction. The masses of the cartridge or body member 10 and any individual plate or washer at all times react differently to a given vibration, and one damping element may tend to counteract the motion of another. The result is that the cartridge, if considered as the originator of the motion, is effectively prevented from vibrating freely by the counteracting elements of the dampening device, with their different inertias, resonances and loose frictions. I term this dampening device a "dynamic dampener," since its action depends on the occurrence of movement of the cartridge, and believe that it has actually achieved the theoretical demand of a "fixed" cartridge and a "mobile" stylus.

Figure 4:
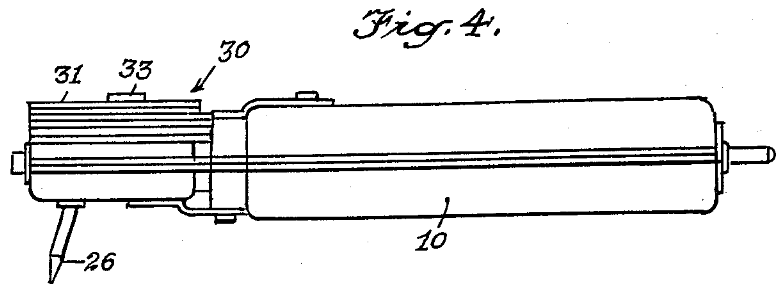
Fig. 4 is a side elevational view of the cartridge or transducer per se.
Figure 5:
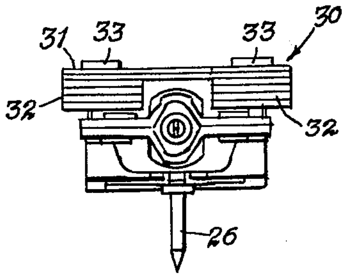
Fig. 5 is a front end elevational view of the cartridge.

It will be readily observed from an inspection of Figs. 4 and 5 that the studs 33 support the plates 31 and washers 32 loosely on the upper portion of the cartridge 10 above the stylus 26, and that said plates and washers are restricted against relative vertical movement with respect to the cartridge, while permitted a predetermined movement laterally of the stylus; by this organization a most effective lateral dampening of the cartridge is had, this being desirable since unwanted vibrations which adversely affect the tonal quality of the reproduction are mostly those which tend to move the cartridge 10 laterally of the stylus.

By the provision of the improved dynamic dampener as above set forth there is obviated any necessity for filtering equipment in the play-back circuit, which equipment of necessity adversely affects the volume and tone quality of the reproduction. Instead, the full capacity of the amplifier with regard to fidelity, volume and frequency response is available to the cartridge, to produce the desired reproduction. The dynamic dampener as above set forth is extremely simple and economical to manufacture, and effects a desired overall economy in the equipment while improving the response thereof.

Variations and modifications may be made within the scope of the claims and portions of the improvements may be used without other.

I claim:

1. A transducer for use in connection with sound equipment, comprising a body member; a stylus carried by the body member for engagement with a sound record medium; and a multitude of rigid non-yieldable weighted elements movably carried by the body member, said elements being in loose frictional contact with each other.

2. The combination of a transducer for use in connection with sound equipment, said transducer including a body member; a stylus carried by the body member for engagement with a sound record medium; a tone arm; means mounting the body member on the tone arm, said means providing a limited amount of lateral movement of the member on the arm; and a multitude of rigid non-yieldable weighted elements movably mounted on the body member in loose frictional contact with each other.

3. The combination of a transducer for use in connection with sound equipment, said transducer including a body member; a stylus carried by the body member for engagement with a sound record medium; a tone arm; means mounting the body member on the tone arm, said means providing a limited amount of lateral movement of the member on the arm; and said stylus having a lateral movement in the same direction as said lateral movement of the body member with respect to the tone arm; and a multitude of rigid non-yieldable weighted elements movably mounted on said body member, said elements being in loose frictional contact with each other to provide a damping effect on said body member.

References Cited in the file of this patent

UNITED STATES PATENTS

| | | |
|---|---|---|
| 707,441 | Mellett | Aug. 12, 1903 |
| 732,443 | Redfield | June 30, 1903 |
| 1,905,723 | Landsman | Apr. 25, 1933 |
| 1,996,104 | Forte | Apr. 2, 1935 |
| 2,270,902 | Rubisson | Jan. 27, 1942 |
| 2,488,608 | Sinnett | Nov. 22, 1949 |
| 2,489,862 | Cook | Nov. 29, 1949 |
| 2,803,713 | Miller | Aug. 20, 1957 |